(12) United States Patent
Jeong et al.

(10) Patent No.: US 11,735,367 B2
(45) Date of Patent: Aug. 22, 2023

(54) MULTILAYER ELECTRONIC COMPONENT

(71) Applicant: SAMSUNG ELECTRO-MECHANICS CO., LTD., Suwon-si (KR)

(72) Inventors: Do Young Jeong, Suwon-si (KR); Jin Mo Ahn, Suwon-si (KR); Eun Hee Jeong, Suwon-si (KR); Ga Young An, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 17/470,242

(22) Filed: Sep. 9, 2021

(65) Prior Publication Data

US 2022/0208467 A1 Jun. 30, 2022

(30) Foreign Application Priority Data

Dec. 24, 2020 (KR) ........................ 10-2020-0183658

(51) Int. Cl.
*H01G 4/30* (2006.01)
*H01G 4/008* (2006.01)
*H01G 4/012* (2006.01)

(52) U.S. Cl.
CPC ............... *H01G 4/30* (2013.01); *H01G 4/008* (2013.01); *H01G 4/012* (2013.01)

(58) Field of Classification Search
CPC ............ H01G 4/30; H01G 4/12; H01G 4/248; H01G 4/012; H01G 4/1209; H01G 4/232; H01G 4/0085; H01G 4/1227; H01G 4/2325; H01G 4/008
See application file for complete search history.

(56) References Cited

U.S. PATENT DOCUMENTS

| 2008/0239617 | A1* | 10/2008 | Motoki ..................... H01G 4/30 29/25.42 |
| 2018/0082785 | A1* | 3/2018 | Asano ..................... H01G 4/232 |
| 2018/0082786 | A1* | 3/2018 | Asano ....................... H01G 4/30 |
| 2018/0174753 | A1* | 6/2018 | Terashita ............... H01G 4/008 |
| 2019/0131076 | A1* | 5/2019 | Fukumura .............. H01G 4/232 |
| 2019/0385795 | A1* | 12/2019 | Yang ........................ H01G 4/30 |

FOREIGN PATENT DOCUMENTS

| KR | 10-2018-0031567 A | 3/2018 |
| KR | 10-2019-0116161 A | 10/2019 |

* cited by examiner

*Primary Examiner* — Michael P McFadden
(74) *Attorney, Agent, or Firm* — Morgan, Lewis & Bockius LLP

(57) ABSTRACT

A multilayer electronic component includes an external electrode having a connection portion and a band portion. An organic layer is disposed between an electrode layer and a plating layer of the band portion of the external electrode, and a conductive resin layer is disposed between the electrode layer and the plating layer of the connection portion of the external electrode.

19 Claims, 5 Drawing Sheets

MULTILAYER ELECTRONIC COMPONENT

CROSS-REFERENCE TO RELATED APPLICATION(S)

This application claims benefit of priority to Korean Patent Application No. 10-2020-0183658 filed on Dec. 24, 2020 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), a multilayer electronic component, is a chip-type condenser mounted on the printed circuit boards of various types of electronic products such as display devices including liquid crystal displays (LCDs) and plasma display panels (PDPs), computers, smartphones, cell phones, and the like, to allow electricity to be charged therein and discharged therefrom.

Such an MLCC having advantages such as compactness, guaranteed high capacitance, and ease in mounting thereof may be used as components of various electronic devices. As various electronic devices such as computers, mobile devices, and the like, have become smaller and higher in terms of power output, demand for miniaturization and higher capacitance of multilayer ceramic capacitors has increased.

In addition, as industry interest in electric parts for automobiles has recently increased, MLCCs are also required to have high reliability and high strength characteristics in order to be used in automobile or infotainment systems.

In order to ensure bending strength of a multilayer electronic component, a method of improving bending strength by disposing an organic layer between an electrode layer and a plating layer has been proposed.

However, the organic layer degrades electrical connectivity between the electrode layer and the plating layer to thereby increase equivalent series resistance (ESR).

SUMMARY

Exemplary embodiments provide a multilayer electronic component having low equivalent series resistance (ESR).

Exemplary embodiments provide a multilayer electronic component having improved flexural strength characteristics.

According to another aspect of the present disclosure, a multilayer electronic component includes: a body including a dielectric layer and first and second internal electrodes alternately disposed with the dielectric layer interposed therebetween in a first direction and including first and second surfaces opposing each other in the first direction, third and fourth surfaces connected to the first and second surfaces and opposing each other in a second direction, and fifth and sixth surfaces connected to the first to fourth surfaces and opposing each other in a third direction; a first external electrode including a first connection portion disposed on the third surface and a first band portion extending from the first connection portion onto the first, second, fifth, and sixth surfaces; and a second external electrode including a second connection portion disposed on the fourth surface and a second band portion extending from the second connection portion onto the first, second, fifth, and sixth surfaces. The first external electrode includes a first electrode layer connected to the first internal electrode and a first plating layer disposed on the first electrode layer, a first conductive resin layer is disposed between the first electrode layer and the first plating layer of the first connection portion, a first organic layer is disposed between the first electrode layer and the first plating layer of the first band portion, and the second electrode includes a second electrode layer connected to the second internal electrode and a second plating layer disposed on the second electrode layer, a second conductive resin layer is disposed between the second electrode layer and the second plating layer of the second connection portion, and a second organic layer is disposed between the second electrode layer and the second plating layer of the second band portion.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
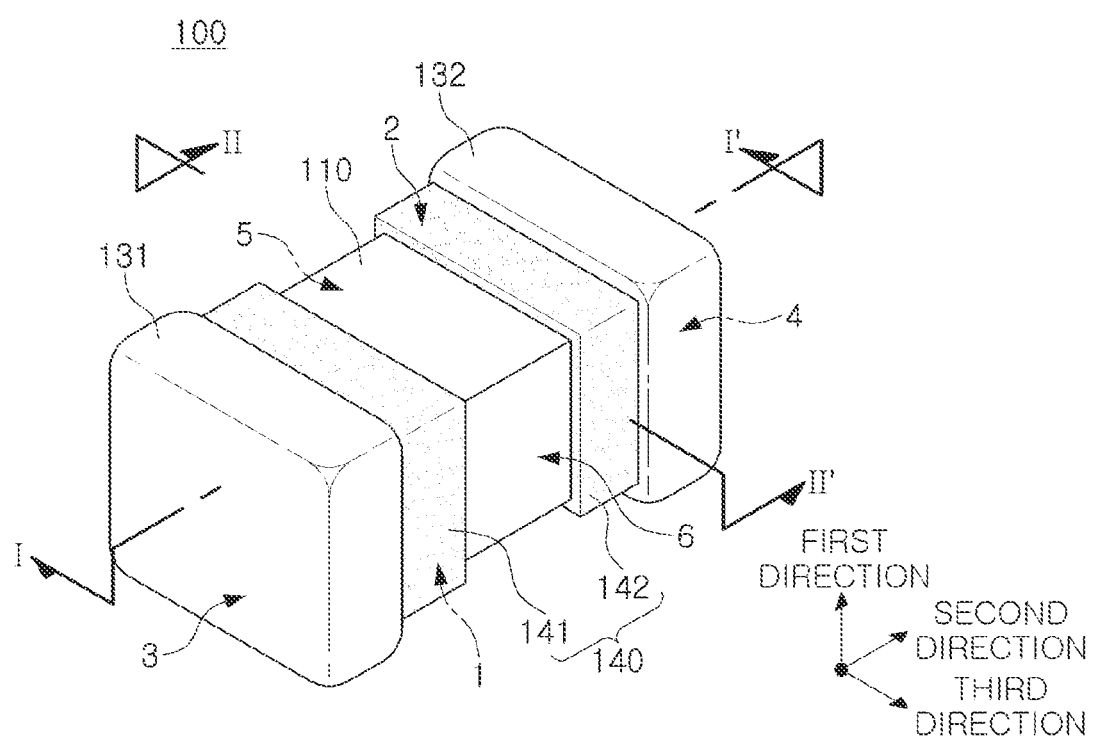
FIG. 1 is a schematic perspective view of a multilayer electronic component according to an exemplary embodiment in the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or exemplary embodiment, e.g., as to what an example or exemplary embodiment may include or implement, means that at least an example or exemplary embodiment exists in which such a feature is included or implemented while all examples and exemplary embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there may be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after gaining an understanding of the disclosure of this application. Further, although the examples described herein have a variety of configurations, other configurations are possible as will be apparent after an understanding of the disclosure of this application.

The drawings may not be to scale, and the relative size, proportions, and depiction of elements in the drawings may be exaggerated for clarity, illustration, and convenience.

In the drawings, a first direction may be defined as a stacking direction or a thickness (T) direction, a second direction may be defined as a length (L) direction, and a third direction may be defined as a width (W) direction.

Multilayer Electronic Component

FIG. 1 is a schematic perspective view of a multilayer electronic component according to an exemplary embodiment in the present disclosure.

Figure 2:
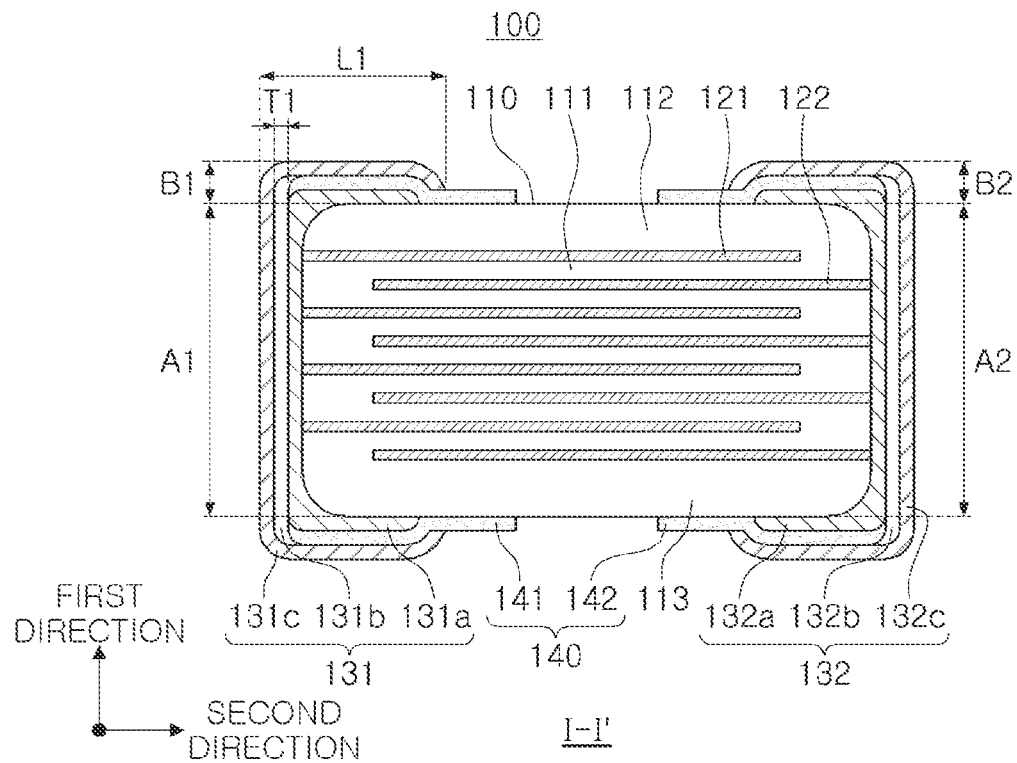
FIG. 2 is a cross-sectional view taken along line I-I' of FIG. 1.

FIG. 2 is a cross-sectional view taken along line I-I' of FIG. 1.

Figure 3:
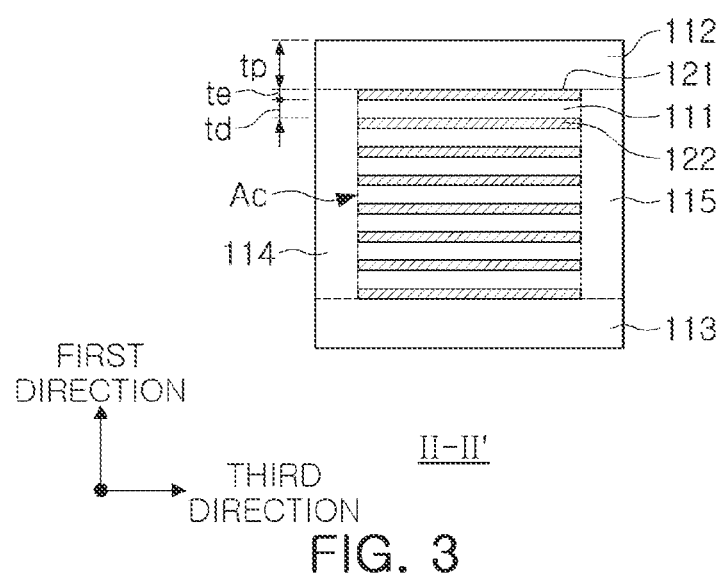
FIG. 3 is a cross-sectional view taken along line II-II' of FIG. 1.

FIG. 3 is a cross-sectional view taken along line II-II' of FIG. 1.

Figure 4:
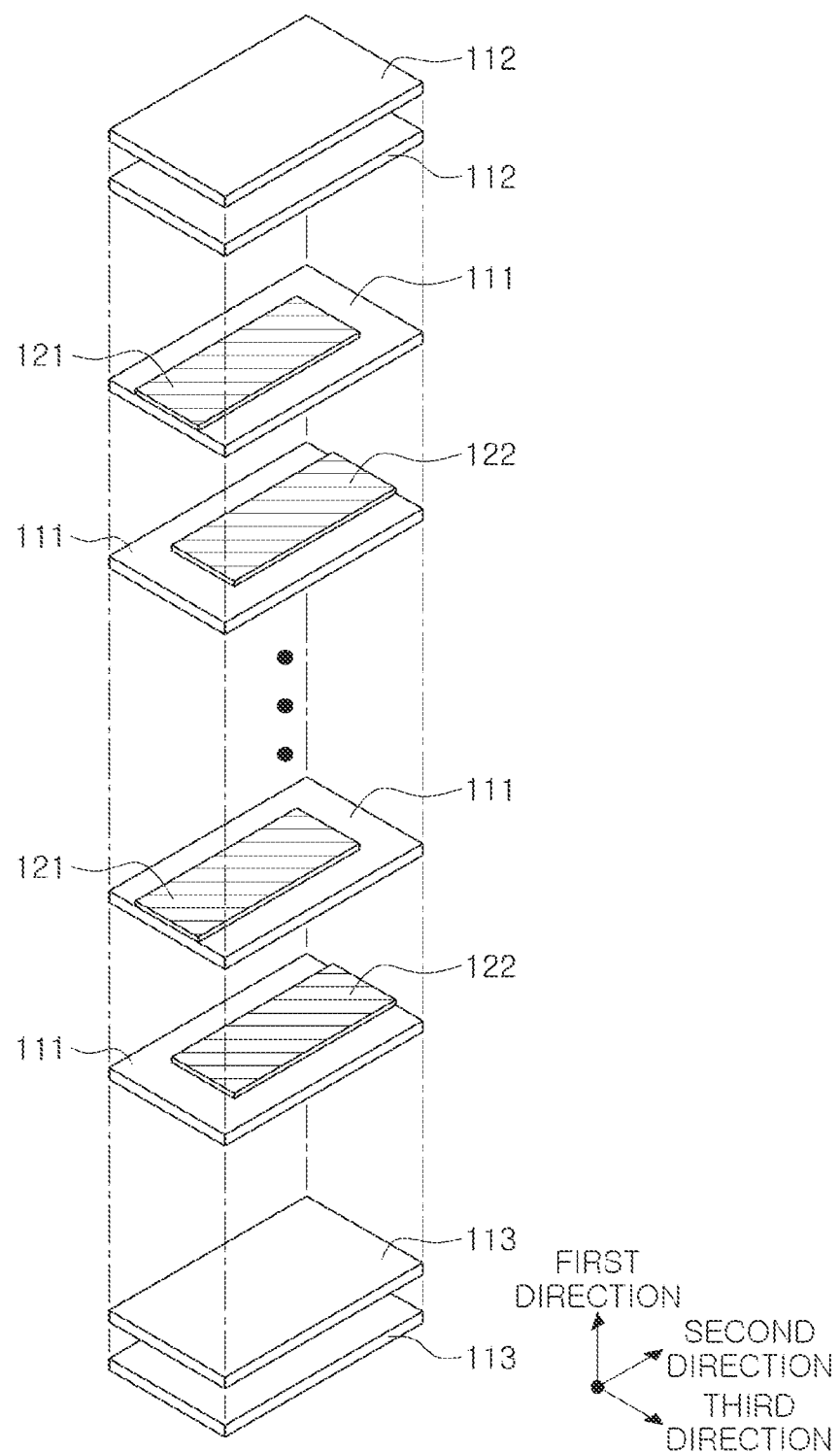
FIG. 4 is an exploded perspective view schematically illustrating a body in which dielectric layers and internal electrodes are stacked according to an exemplary embodiment in the present disclosure.

FIG. 4 is an exploded perspective view schematically illustrating a body in which dielectric layers and internal electrodes are stacked according to an exemplary embodiment in the present disclosure.

Hereinafter, a multilayer electronic component 100 according to an exemplary embodiment in the present disclosure will be described with reference to FIGS. 1 through 4.

The multilayer electronic component 100 according to an exemplary embodiment in the present disclosure includes a body 110 including a dielectric layer 111 and first and second internal electrodes 121 and 122 alternately disposed with the dielectric layer 111 interposed therebetween in a first direction and including first and second surfaces 1 and 2 opposing each other in the first direction, third and fourth surfaces 3 and 4 connected to the first and second surfaces 1 and 2 and opposing each other in a second direction, and fifth and sixth surfaces 5 and 6 connected to the first to fourth surfaces 1, 2, 3, and 4 and opposing each other in a third direction; a first external electrode 131 including a first connection portion A1 disposed on the third surface 3 and a first band portion B1 extending from the first connection portion A1 to the first, second, fifth, and sixth surfaces 1, 2, 5, and 6; and a second external electrode 132 including a second connection portion A2 disposed on the fourth surface 4 and a second band portion B2 extending from the second connection portion A2 to the first, second, fifth, and sixth surfaces 1, 2, 5, and 6. The first external electrode 131 includes a first electrode layer 131a connected to the first internal electrode 121 and a first plating layer 131c disposed on the first electrode layer 131a, a first conductive resin layer 131b is disposed between the first electrode layer 131a and the first plating layer 131c of the first connection portion A1, a first organic layer 141 is disposed between the first electrode layer 131a and the first plating layer 131c of the first band portion B1, and the second electrode 132 includes a second electrode layer 132a connected to the second internal electrode 122 and a second plating layer 132c disposed on the second electrode layer 132a, a second conductive resin layer 132b is disposed between the second electrode layer 132a and the second plating layer 132c of the second connection portion A2, and a second organic layer 142 is disposed between the second electrode layer 132a and the second plating layer 132c of the second band portion B2.

In the body 110, the dielectric layer 111 and the internal electrodes 121 and 122 are alternately stacked.

A specific shape of the body 110 is not limited, but, as illustrated, the body 110 may have a hexahedral shape or a similar shape. Due to shrinkage of ceramic powder particle contained in the body 110 during firing, the body 110 may not have a hexahedral shape with perfect straight lines but a substantially hexahedral shape.

The body 110 may have the first and second surfaces 1 and 2 opposing each other in the first direction, the third and fourth surfaces 3 and 4 connected to the first and second surfaces 1 and 2 and opposing each other in the second direction, and the fifth and sixth surfaces 5 an 6 connected to the first and second surfaces 1 and 2, connected to the third and fourth surfaces 3 and 4, and opposing each other in the third direction.

A plurality of dielectric layers 111 forming the body 110 are in a sintered state, and adjacent dielectric layers 111 may be integrated such that boundaries therebetween may not be readily apparent without using a scanning electron microscope (SEM).

According to an exemplary embodiment in the present disclosure, a material for forming the dielectric layer 111 is not limited as long as sufficient electrostatic capacitance may be obtained. For example, a barium titanate-based material, a lead composite perovskite-based material, or a strontium titanate-based material may be used. The barium titanate-based material may include a $BaTiO_3$-based ceramic powder particle, and the ceramic powder particle may include $BaTiO_3$ and $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$ obtained by partially dissolving calcium (Ca), zirconium (Zr), and the like in $BaTiO_3$.

As a material for forming the dielectric layer 111, various ceramic additives, organic solvents, binders, dispersants, etc. may be added to the powder particle such as barium titanate ($BaTiO_3$) or the like according to purposes of the present disclosure.

Meanwhile, a thickness td of the dielectric layer 111 may not be particularly limited. However, the thickness td of the dielectric layer 111 may be 0.6 μm or less in order to more easily achieve miniaturization and high capacitance of the multilayer electronic component. Here, the thickness td of the dielectric layer 111 may refer to an average thickness of the dielectric layer 111.

The body 110 may include an active portion Ac disposed inside the body 110 and including the first internal electrode 121 and the second internal electrode 122 disposed to face each other with the dielectric layer 111 interposed therebetween to form capacitance and cover portions 112 and 113 formed above and below the active portion Ac in the first direction.

In addition, the active portion Ac, a portion that contributes to the formation of capacitance of the capacitor, may be formed by repeatedly stacking a plurality of first and second internal electrodes 121 and 122 with a dielectric layer 111 interposed therebetween.

The cover portions 112 and 113 include an upper cover portion 112 disposed above the active portion Ac in the first direction and a lower cover portion 113 disposed below the active portion Ac in the first direction.

The upper cover portion 112 and the lower cover portion 113 may be formed by stacking a single dielectric layer or two or more dielectric layers on upper and lower surfaces of the active portion Ac in the thickness direction, respectively, and basically serve to prevent damage to the internal electrodes due to physical or chemical stress.

The upper cover portion 112 and the lower cover portion 113 do not include internal electrodes, and may include the same material as the dielectric layer 111.

That is, the upper cover portion 112 and the lower cover portion 113 may include a ceramic material, for example, a barium titanate ($BaTiO_3$)-based ceramic material.

In addition, margin portions 114 and 115 may be disposed on side surfaces of the active portion Ac.

The margin portions 114 and 115 may include a margin portion 114 disposed on the fifth surface 5 of the body 110 and a margin portion 115 disposed on the sixth surface 6 of the body 10. That is, the margin portions 114 and 115 may be disposed on both side surfaces of the active portion Ac in the width direction.

As shown in FIG. 3, the margin portions 114 and 115 may refer to a region between both ends of the first and second internal electrodes 121 and 122 and a boundary surface of the body 110 in a cross-section taken in the width-thickness (W-T) direction of the body 110.

The margin portions 114 and 115 may basically serve to prevent damage to the internal electrodes due to physical or chemical stress.

The margin portions 114 and 115 may be formed as the internal electrodes are formed by applying a conductive paste on a ceramic green sheet excluding a region where the margin portions are to be formed.

In addition, in order to suppress a step difference due to the internal electrodes 121 and 122, the margin portions 114 and 115 may be formed by cutting the internal electrodes to be exposed to the fifth and sixth surfaces 5 and 6 of the body after stacking and subsequently stacking a single dielectric layer or two or more dielectric layers on both side surfaces of the active portion Ac in the width direction.

The internal electrodes 121 and 122 are alternately stacked with the dielectric layers 111.

The internal electrodes 121 and 122 may include first and second internal electrodes 121 and 122. The first and second internal electrodes 121 and 122 may be alternately disposed to face each other with a dielectric layer 111 configuring the body 110 interposed therebetween and may be exposed to the third and fourth surfaces 3 and 4 of the body 100, respectively.

Referring to FIG. 2, the first internal electrode 121 may be spaced apart from the fourth surface 4 and exposed to the third surface 3, and the second internal electrode 122 may be spaced apart from the third surface 3 and exposed to the fourth surface 4. The first external electrode 131 may be disposed on the third surface 3 of the body and connected to the first internal electrode 121 and the second external electrode 132 may be disposed on the fourth surface 4 of the body and connected to the second internal electrode 122.

In other words, the first internal electrode 121 may not be connected to the second external electrode 132 and may be connected to the first external electrode 131, and the second internal electrode 122 may not be connected to the first external electrode 131 and may be connected to the second external electrode 132. Accordingly, the first internal electrode 121 may be formed to be spaced apart from the fourth surface 4 by a predetermined distance, and the second internal electrode 122 may be formed to be spaced apart from the third surface 3 by a predetermined distance.

Here, the first and second internal electrodes 121 and 122 may be electrically separated from each other by the dielectric layer 111 disposed therebetween.

Referring to FIG. 4, the body 110 may be formed by stacking a ceramic green sheet on which the first internal electrode 121 is printed and a ceramic green sheet on which the second internal electrode 122 is printed in the thickness direction (Z direction) and subsequently firing the stack.

A material forming the internal electrodes 121 and 122 is not limited, and a material having excellent electrical conductivity may be used. For example, the internal electrodes 121 and 122 may include at least one of nickel (Ni), copper (Cu), palladium (Pd), silver (Ag), gold (Au), platinum (Pt), tin (Sn), tungsten (W), titanium (Ti), and alloys thereof.

In addition, the internal electrodes 121 and 122 may be formed by printing a conductive paste for internal electrodes including at least one of nickel (Ni), copper (Cu), palladium (Pd), silver (Ag), gold (Au), platinum (Pt), tin (Sn), tungsten (W), titanium (Ti), and alloys thereof on a ceramic green sheet. A printing method of the conductive paste for internal electrodes may be a screen printing method or a gravure printing method, but the present disclosure is not limited thereto.

Meanwhile, a thickness te of the internal electrodes 121 and 122 may not be particularly limited. However, the thickness te of the internal electrodes 121 and 122 may be 0.6 µm or less in order to more easily achieve miniaturization and high capacitance of the multilayer electronic component. Here, the thickness te of the internal electrodes 121 and 122 may refer to an average thickness of the internal electrodes 121 and 122.

Referring to FIG. 2, when regions of the first external electrode 131 are divided according to positions, the first external electrode 131 may include the first connection portion A1 disposed on the third surface 3 of the body and the first band portion B1 extending from the first connection portion A1 to portions of the first, second, fifth, and sixth surfaces 1, 2, 5, and 6.

The first external electrode 131 includes the first electrode layer 131a connected to the first internal electrode 121 and the first plating layer 131c disposed on the first electrode layer 131a. The first conductive resin layer 131b is disposed between the first electrode layer 131a and the first plating layer 131c of the first connection portion A1, and the organic layer 141 is disposed between the first electrode layer 131a and the first plating layer 131c of the first band portion B1.

When regions of the second external electrode 132 are divided according to positions, the second external electrode 132 may include a second connection portion A2 disposed on the fourth surface 4 of the body and the second band portion B2 extending from the second connection portion A2 to portions of the first, second, fifth, and sixth surfaces 1, 2, 5, and 6.

The second external electrode 132 includes the second electrode layer 132a connected to the second internal electrode 122 and the second plating layer 132c disposed on the second electrode layer 132a. The second conductive resin layer 132b is disposed between the second electrode layer 132a and the second plating layer 132c of the second connection portion A2, and the second organic layer 142 is disposed between the second electrode layer 132a and the second plating layer 132c of the second band portion B2.

In the related art, in order to ensure flexural strength of the multilayer electronic component, a method of improving flexural strength by disposing an organic layer between the electrode layer and the plating layer has been proposed. However, the organic layer lowers electrical connectivity between the electrode layer and the plating layer to increase equivalent series resistance (ESR).

According to an exemplary embodiment in the present disclosure, flexural strength characteristics may be improved by disposing the organic layers 141 and 142 between the electrode layers 131a and 132a and the plating layers 131c and 132c of the band portions B1 and B2 and ESR may be lowered by disposing the conductive resin layers 131b and 132b between the electrode layers 131a and 132a and the plating layers 131c and 132c of the connection portions A1 and A2.

The first and second electrode layers 131 and 132 may be formed of any material as long as the material has electrical conductivity, such as a metal, and a specific material may be determined in consideration of electrical characteristics and structural stability.

For example, the first and second electrode layers 131 and 132 may include a conductive metal and glass.

A conductive metal used in the electrode layers 131a and 132a is not limited as long as it is a material that may be electrically connected to the internal electrode for forming capacitance. For example, the conductive metal may include at least one selected from the group consisting of nickel (Ni), copper (Cu), palladium (Pd), silver (Ag), gold (Au), platinum (Pt), tin (Sn), tungsten (W), titanium (Ti), and alloys thereof.

The electrode layers 131a and 132a may be formed by applying a conductive paste prepared by adding a glass frit to the conductive metal powder particle and subsequently firing the conductive paste.

The plating layers 131c and 132c may be disposed on the electrode layers 131a and 132a.

The plating layers 131c and 132c basically serve to improve mounting characteristics. A type of the plating layers 131c and 132c is not particularly limited, may be plating layers including at least one of Ni, Sn, Pd, and alloys thereof, and may be formed of a plurality of layers.

For a more specific example of the plating layers 131c and 132c, the plating layers 131c and 132c may be Ni plating layers or Sn plating layers, and here, the Ni plating layer and the Sn plating layer are sequentially formed on the electrode layer 131a or 132a. However, the present disclosure is not limited thereto, and the plating layers 131c and 132c may include a Sn plating layer, a Ni plating layer, and a Sn plating layer formed in sequence or may include a plurality of Ni plating layers and/or a plurality of Sn plating layers.

The first conductive resin layer 131b is disposed between the first electrode layer 131a and the first plating layer 131c of the first connection portion A1, and the first organic layer 141 is disposed between the first electrode layer 131a and the first plating layer 131c of the first band portion B1. The second conductive resin layer 132b is disposed between the second electrode layer 132a and the second plating layer 132c of the second connection portion A2, and the second organic layer 142 is disposed between the second electrode layer 132a and the second plating layer 132c of the second band portion B2.

The conductive resin layers 131b and 132b disposed between the electrode layers 131a and 132a and the plating layers 131c and 132c of the connection portions A1 and A2 serve to improve electrical connectivity between the electrode layers 131a and 132a and the plating layers 131c and 132c to lower ESR.

The organic layers 141 and 142 disposed between the electrode layers 131a and 132a and the plating layers 131c and 132c of the band portions B1 and B2 serve to restrain transmission of an external force due to warpage of a substrate or the like to cause cracking in the body 110, thereby improving flexural strength characteristics of the multilayer electronic component 100. In addition, the organic layers 141 and 142 may suppress penetration of moisture into the body 110 to thereby improve moisture resistance reliability.

In an exemplary embodiment, the first organic layer 141 may be disposed to cover the end of the first electrode layer 131a at the first band portion B1, and the second organic layer 142 may be disposed to cover the end of the second electrode layer 132a at the second band portion B2. Accordingly, flexural strength may be further improved according to the arrangement of the organic layers 141 and 142.

In an exemplary embodiment, the first organic layer 141 is disposed to extend further than the end of the first plating layer 131c of the first band portion B1 to cover portions of the first, second, fifth, and sixth surfaces 1, 2, 5, and 6. The second organic layer 142 may be disposed to extend further than the end of the second plating layer 132c of the second band portion B2 to cover portions of the first, second, fifth, and sixth surfaces 1, 2, 5, and 6. Accordingly, flexural strength may be further improved according to the arrangement of the organic layers 141 and 142.

In addition, the organic layers 141 and 142 disposed to be in contact with the surface of the body 110 may seal fine pores or cracks of the body 110, thereby preventing moisture from penetrating into the body through an outer surface of the body.

In an exemplary embodiment, the first and second organic layers 141 and 142 may include an organic silicon compound. As the organic silicon compound, for example, decyltrimethoxysilane, n-propyltrimethoxysilane, octyltriethoxysilane, or the like may be used.

In this case, the organic silicon compound has a structure of a polyfunctional alkoxysilane $Si-(C_nH_{2n+1})_3$ and may include an N element. Accordingly, the effect of improving flexural strength and moisture resistance reliability may be further improved.

In an exemplary embodiment, in a cross-section taken in the first and second directions at a center of the body in the third direction, when a maximum size of the first conductive resin layer 131b in the second direction at the first connection portion A1 is T1 and a first-directional size from an end of the plating layer 131c of the first band portion B1 to an outermost side of the first external electrode 131 in the second direction is L1, T1/L1 is 0.1 or less. If T1/L1 exceeds 0.1, the effect of lowering ESR may be insufficient.

Here, T1 may refer to a maximum thickness of the first conductive resin layer 131b, and L1 may refer to a length of the band portion B1.

Meanwhile, a lower limit of T1/L1 is not particularly limited, but in order to further improve flexural strength, T1/L1 may be preferably 0.04 or more.

The measurement of T1 and L1 may be performed by an optical microscope or a scanning electron microscope (SEM), although the present disclosure is not limited thereto. Other methods and/or tools appreciated by one of ordinary skill in the art, even if not described in the present disclosure, may also be used.

The first conductive resin layer 131b is disposed between the first electrode layer 131a and the first plating layer 131c of the first connection portion A1, and the second conductive resin layer 132b is disposed between the second electrode layer 132a and the second plating layer 132c of the second connection portion A2.

The conductive resin layers 131b and 132b disposed between the electrode layers 131a and 132a and the plating layers 131c and 132c of the connection portions A1 and A2 may improve electrical connectivity between the electrode layers 131a and 132a and the plating layers 131c and 132c to lower ESR.

A method of forming the conductive resin layers 131b and 132b disposed at the connection portions A1 and A2 is not particularly limited. For example, after the electrode layers 131a and 132a are formed on the body 110, an organic layer may be formed on the electrode layers 131a and 132a and an outer surface of the body 110, the organic layer disposed at the connection portion is removed to expose the electrode layer, and a conductive resin layer may then be formed on the electrode layer of the connection portion.

In the process of removing the organic layer disposed at the connection portion, the organic layer may be left on a portion of the connection portion. Accordingly, the first organic layer 141 may extend to be disposed at a portion of the first connection portion A1, and the second organic layer 142 may extend to be disposed at a portion of the second connection portion A2.

The first organic layer 141 may extend to be disposed at a portion of the first connection portion A1, and the second organic layer 142 may extend to be disposed at a portion of the second connection portion A2.

When the electrode layers 131a and 132a include a conductive metal and glass, the electrode layers 131a and 132a at corner portions, regions between the connection portions A1 and A2 and the band portions B1 and B2, may be formed thin. Because of this, the corner portions may become a main moisture penetration path to degrade moisture resistance reliability. Therefore, the first organic layer 141 may extend to and disposed at a portion of the first connection portion A1 and the second organic layer 142 may extend to and disposed at a portion of the second connection portion A2 to block the main moisture penetration path to further improve moisture resistance reliability.

Here, the first organic layer 141 may be disposed between the first conductive resin layer 131b and the first electrode layer 131a at the first connection portion A1, and the second organic layer 142 may be disposed between the second conductive resin layer 132b and the second electrode layer 132a at the second connection portion A2.

The conductive resin layers 131b and 132b may include a conductive metal and a base resin.

The conductive metal included in the conductive resin layers 131b and 132b serves to electrically connect the conductive resin layers 131b and 132b to the electrode layers 131a and 132a.

The conductive metal included in the conductive resin layers 131b and 132b is not particularly limited as long as it is a material that may be electrically connected to the electrode layers 131a and 132a, and may include at least one selected from the group consisting of, for example, nickel (Ni), copper (Cu), palladium (Pd), silver (Ag), gold (Au), platinum (Pt), tin (Sn), tungsten (W), titanium (Ti), and alloys thereof.

The conductive metal included in the conductive resin layers 131b and 132b may include at least one of a spherical powder particle and a flake powder particle. That is, the conductive metal may be formed of only the flake powder particle or only the spherical powder particle or may be formed of a mixture of the flake powder particle and the spherical powder particle.

Here, the spherical powder particle may include a form that is not completely spherical, for example, a form in which a length ratio of a major axis and a minor axis (major axis/minor axis) is 1.45 or less.

The flake powder particle refers to a powder particle having a flat and elongated shape, in which a length ratio of a major axis and a minor axis (major axis/minor axis) may be 1.95 or more, but is not limited thereto.

The lengths of the major axis and the minor axis of the spherical powder particle and the flake powder particle may be measured from an image obtained by scanning the first- and second-directional cross-section taken at the center of a multilayer electronic component in the third direction with the SEM.

The base resin included in the conductive resin layers 131b and 132b serve to ensure bondability and absorb shocks.

The base resin included in the conductive resin layers 131b and 132b is not particularly limited as long as it has bondability and shock absorbing properties and may be mixed with conductive metal powder particles to make a paste. For example, the base resin may include an epoxy resin.

In addition, the conductive resin layers 131b and 132b may include a plurality of metal powder particles, an intermetallic compound, and a base resin.

The intermetallic compound serves to connect the plurality of metal powder particles to improve electrical connectivity and may surround the plurality of metal powder particles to connect the metal powder particles to each other.

Here, the intermetallic compound may include a metal having a melting point lower than a curing temperature of the base resin.

That is, since the intermetallic compound contains a metal having a melting point lower than the curing temperature of the base resin, the metal having a melting point lower than the curing temperature of the base resin is melted during a drying and curing process and forms an intermetallic compound with a portion of the metal powder particles to surround the metal powder particles. Here, the intermetallic compound may preferably include a low melting point metal of 300° C. or less.

For example, the intermetallic compound may include Sn having a melting point of 213 to 220° C. During the drying and curing process, Sn is melted, and the molten Sn wets metal powder particles having a high melting point such as Ag, Ni or Cu by a capillary phenomenon and reacts with some of the Ag, Ni or Cu metal powder particles. Intermetallic compounds such as $Ag_3Sn$, $Ni_3Sn_4$, $Cu_6Sn_5$, and $Cu_3Sn$ are formed. Ag, Ni, or Cu not participating in the reaction remain in the form of metal powder particles.

Accordingly, the plurality of metal powder particles may include at least one of Ag, Ni, and Cu, and the intermetallic compound may include at least one of $Ag_3Sn$, $Ni_3Sn_4$, $Cu_6Sn_5$, and $Cu_3Sn$.

Figure 5:
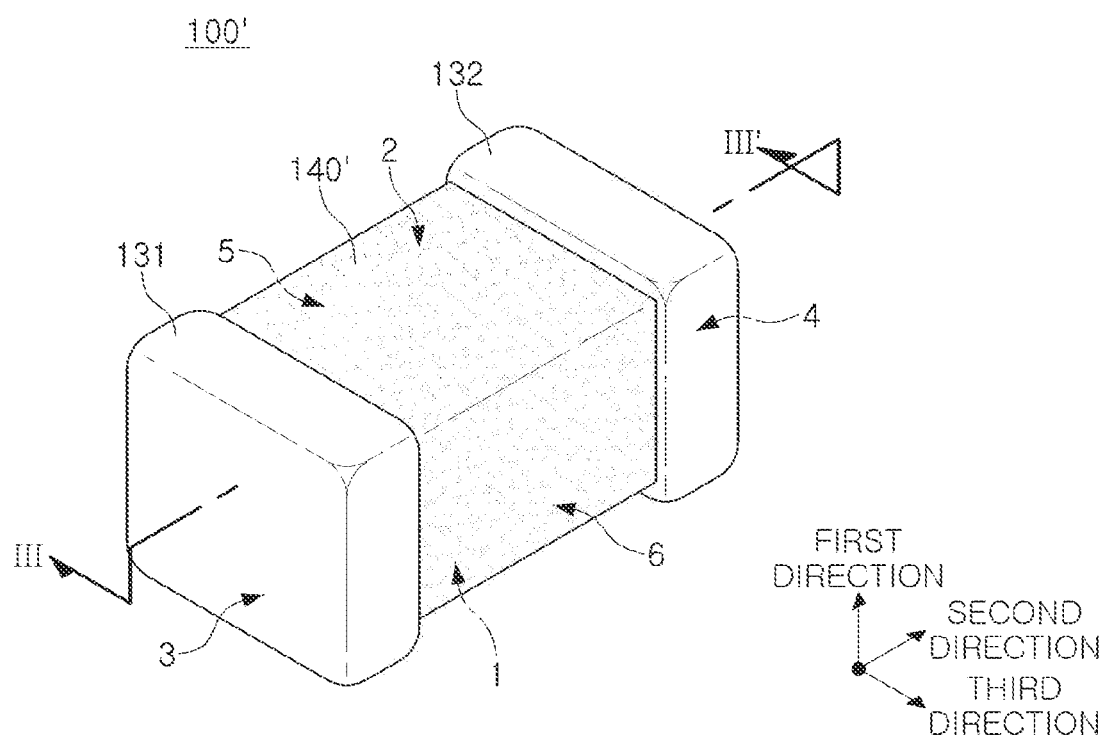
FIG. 5 is a schematic perspective view of a multilayer electronic component according to a modification of an exemplary embodiment in the present disclosure.
Figure 6:
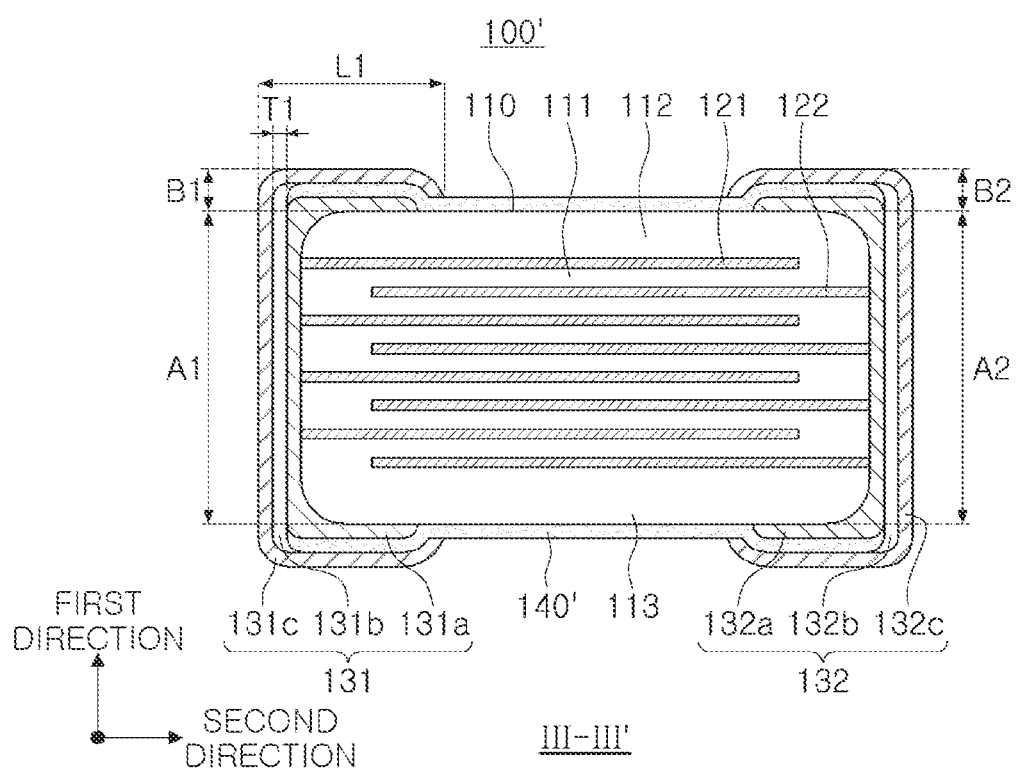
FIG. 6 is a cross-sectional view taken along line III-III' of FIG. 5.

FIG. 5 is a schematic perspective view of a multilayer electronic component 100' according to a modification of an exemplary embodiment in the present disclosure. FIG. 6 is a cross-sectional view taken along line III-III' of FIG. 5.

Referring to FIGS. 5 and 6, first and second organic layers may extend to cover all of the first, second, fifth, and sixth of the body 110 on which the first and second electrode layers 131a and 132a are not disposed, and may be connected to each other so as to be disposed as one organic layer 140'.

EXAMPLE

After an electrode layer was formed on a body in which a dielectric layer and internal electrodes were stacked, an organic layer having a structure of polyfunctional alkoxysilane Si—$(C_nH_{2n+1})_3$ and including N element was formed on the electrode layer and an outer surface of the body. Thereafter, the organic layer disposed at a connection portion was removed, and a conductive resin layer was formed on the connection portion, from which the organic layer was removed, to have a thickness satisfying T1/L1 in Table 1 below. However, in the case of Test Nos. 1, 7, 13, 19, and 25, the organic layer was not removed and the conductive resin layer was not formed. Thereafter, a plating layer was formed to complete a sample chip.

As for the sizes of Table 1 below, 1005 refers to a size that a length of the sample chip is 1.0 mm and a width thereof is 0.5 mm, 1608 refers to a size that a length of the sample chip is 1.6 mm and a width thereof is 0.8 mm, 2012 refers to a size that a length of the sample chip is 2.0 mm and a width thereof is 1.2 mm, 3216 refers to a size that a length of the sample chip is 3.2 mm and a width thereof is 1.6 mm, and 3225 refers to a size that a length of the sample chip is 3.2 mm and a width thereof is 2.5 mm.

T1 and L1 were measured in a cross-section cut in the first and second directions at the center of the body 110 in the third direction. T1 is measured as a second-directional maximum size of the first conductive resin layer 131b in the second direction at the first connection portion A1, and L1 is measured as a second-directional size from the end of the plating layer 131c of the first band portion B1 to the outermost side of the first external electrode 131 in the second direction.

ESR was measured from a self-resonance frequency (SRF) using an LCR meter.

TABLE 1

| Test No. | Size | T1/L1 | ESR (mΩ) |
| --- | --- | --- | --- |
| 1* | 1005 | 0 | 9.78 |
| 2 |  | 0.02 | 5.68 |
| 3 |  | 0.04 | 6.42 |
| 4 |  | 0.06 | 7.16 |
| 5 |  | 0.08 | 8.24 |
| 6 |  | 0.1 | 9.68 |
| 7* | 1608 | 0 | 9.68 |
| 8 |  | 0.02 | 5.15 |
| 9 |  | 0.04 | 5.86 |
| 10 |  | 0.06 | 6.67 |
| 11 |  | 0.08 | 7.89 |
| 12 |  | 0.1 | 9.34 |
| 13* | 2012 | 0 | 9.34 |
| 14 |  | 0.02 | 4.32 |
| 15 |  | 0.04 | 5.18 |
| 16 |  | 0.06 | 6.32 |
| 17 |  | 0.08 | 7.52 |
| 18 |  | 0.1 | 9.12 |
| 19* | 3216 | 0 | 9.05 |
| 20 |  | 0.02 | 4.03 |
| 21 |  | 0.04 | 4.65 |
| 22 |  | 0.06 | 5.94 |
| 23 |  | 0.08 | 7.19 |
| 24 |  | 0.1 | 8.97 |
| 25* | 3225 | 0 | 8.68 |
| 26 |  | 0.02 | 3.92 |
| 27 |  | 0.04 | 4.16 |
| 28 |  | 0.06 | 5.31 |
| 29 |  | 0.08 | 6.87 |
| 30 |  | 0.1 | 8.21 |

As can be seen in Table 1, as T1/L1 is controlled to 0.1 or less in various chip sizes, ESR may be secured lower than those in Test Nos. 1, 7, 13, 19, and 25 in which the organic layer disposed at the connection was not removed.

In addition, it can be seen that ESR is lowered as T1/L1 is reduced. However, Test Nos. 2, 8, 14, 20, and 26 in which T1/L1 is 0.02 have the lowest ESR, but since the conductive resin layer is too thin, there is a possibility of degrading flexural strength.

As set forth above, according to an exemplary embodiment, since the organic layer is disposed between the electrode layer and the plating layer of the band portion of the external electrode, and the conductive resin layer is disposed between the electrode layer and the plating layer of the connection portion of the external electrode, ESR may be lowered, while flexural strength characteristics are ensured.

While example exemplary embodiments have been shown and described above, it will be apparent to those skilled in the art that modifications and variations could be made without departing from the scope of the present disclosure as defined by the appended claims.

What is claimed is:

1. A multilayer electronic component comprising:
a body including a dielectric layer and first and second internal electrodes alternately disposed with the dielectric layer interposed therebetween in a first direction and including first and second surfaces opposing each other in the first direction, third and fourth surfaces connected to the first and second surfaces and opposing each other in a second direction, and fifth and sixth surfaces connected to the first to fourth surfaces and opposing each other in a third direction;
a first external electrode including a first connection portion disposed on the third surface and a first band portion extending from the first connection portion onto the first, second, fifth, and sixth surfaces; and
a second external electrode including a second connection portion disposed on the fourth surface and a second band portion extending from the second connection portion onto the first, second, fifth, and sixth surfaces,
wherein the first external electrode includes a first electrode layer connected to the first internal electrode and a first plating layer disposed on the first electrode layer, a first conductive resin layer disposed between the first electrode layer and the first plating layer of the first connection portion, a first organic layer disposed between the first electrode layer and the first plating layer of the first band portion,
wherein the second electrode includes a second electrode layer connected to the second internal electrode and a second plating layer disposed on the second electrode layer, a second conductive resin layer disposed between the second electrode layer and the second plating layer of the second connection portion, and a second organic layer disposed between the second electrode layer and the second plating layer of the second band portion, and
wherein at least one of the first or second surfaces is devoid of at least one of the first or second conductive resin layers thereon.

2. The multilayer electronic component of claim 1, wherein the first organic layer is disposed to cover an end of the first electrode layer at the first band portion, and the second organic layer is disposed to cover an end of the second electrode layer at the second band portion.

3. The multilayer electronic component of claim 2, wherein the first organic layer is disposed to extend further than an end of the first plating layer of the first band portion to cover portions of the first, second, fifth, and sixth surfaces, and
the second organic layer is disposed to extend further than an end of the second plating layer of the second band portion to cover portions of the first, second, fifth, and sixth surfaces.

4. The multilayer electronic component of claim 1, wherein the first and second organic layers include an organic silicon compound.

5. The multilayer electronic component of claim 4, wherein the organic silicon compound has a structure of polyfunctional alcoxy silane Si—$(C_nH_{2n+1})_3$ and includes an N element.

6. The multilayer electronic component of claim 1, wherein T1/L1 is 0.1 or less in which T1 is a maximum size of the first conductive resin layer in the second direction at the first connection portion and L1 is a second-directional size from an end of the plating layer of the first band portion to an outermost side of the first external electrode in the second direction.

7. The multilayer electronic component of claim 1, wherein T1/L1 is 0.1 or less in which T1 is a maximum size of the first conductive resin layer in the second direction at the first connection portion and L1 is a second-directional size from an end of the plating layer of the first band portion to an outermost side of the first external electrode in the second direction, in a cross-section taken in the first and second directions at a center of the body in the third direction.

8. The multilayer electronic component of claim 1, wherein T1/L1 is 0.04 or more and 0.1 or less in which T1 is a maximum size of the first conductive resin layer in the second direction at the first connection portion and L1 is a second-directional size from an end of the plating layer of the first band portion to an outermost side of the first external electrode in the second direction.

9. The multilayer electronic component of claim 1, wherein T1/L1 is 0.04 or more and 0.1 or less in which T1 is a maximum size of the first conductive resin layer in the second direction at the first connection portion and L1 is a second-directional size from an end of the plating layer of the first band portion to an outermost side of the first external electrode in the second direction, in a cross-section taken in the first and second directions at a center of the body in the third direction.

10. The multilayer electronic component of claim 1, wherein the first and second electrode layers include a conductive metal and glass.

11. The multilayer electronic component of claim 1, wherein the first and second conductive resin layers include a conductive metal and a base resin.

12. The multilayer electronic component of claim 1, wherein the base resin includes an epoxy.

13. The multilayer electronic component of claim 1, wherein the first and second plating layers include an Ni plating layer and an Sn plating layer disposed on the Ni plating layer.

14. The multilayer electronic component of claim 1, wherein the first organic layer is disposed to extend to a portion of the first connection portion, and the second organic layer is disposed to extend to a portion of the second connection portion.

15. The multilayer electronic component of claim 14, wherein the first organic layer is spaced apart from a central portion of the first connection portion, and the second organic layer is spaced apart from a central portion of the second connection portion.

16. The multilayer electronic component of claim 14, wherein the first organic layer is disposed between the first conductive resin layer and the first electrode at the first connection portion, and
the second organic layer is disposed between the second conductive resin layer and the second electrode at the second connection portion.

17. The multilayer electronic component of claim 1, wherein the first and second organic layers are disposed to extend to cover all of the first, second, fifth, and sixth surfaces in which the first and second electrode layers are not disposed, and connected to each other.

18. The multilayer electronic component of claim 1, wherein the first organic layer is disposed between and in contact with the first electrode layer and the first plating layer at the first band portion, and the second organic layer is disposed between and in contact with the second electrode layer and the second plating layer at the second band portion.

19. The multilayer electronic component of claim 18, wherein the first conductive resin layer is disposed between and in contact with the first electrode layer and the first plating layer at the first connection portion, and the second conductive resin layer is disposed between and in contact with the second electrode layer and the second plating layer at the second connection portion.

* * * * *